Patented May 16, 1933

1,908,754

UNITED STATES PATENT OFFICE

ROY S. HANCOCK, OF KENVIL, NEW JERSEY, ASSIGNOR TO HERCULES POWDER COMPANY, OF WILMINGTON, DELAWARE, A CORPORATION OF DELAWARE

METHOD OF REFINING ROSIN

No Drawing. Application filed January 26, 1929. Serial No. 335,396.

My invention relates to an improved method for refining rosin and more particularly for the refining of wood rosin for the removal of coloring matter and latent color bodies therefrom and for the production of a rosin of light color having a reduced tendency to crystallize. It will be understood that my invention is applicable to the treatment of gum rosin as well as to the treatment of wood rosin, though, as has been indicated, it is of special advantage in the treatment of wood rosin.

Wood rosin contains in addition to coloring matter, which darkens the color of the rosin, certain latent color bodies which, under normal circumstances, are not observable and do not effect the color of the rosin, but which darken, for example, when the rosin is subjected to the action of oxygen, as in the air, in the presence of an alkali as, for example, in rosin soaps, limed varnishes, certain sizes, etc. and which hence deleteriously affect the product containing the rosin.

Gum rosin of the higher grades usually does not contain such latent color bodies, but contains coloring matter which darkens its color. In certain instances, as in the case of certain low grade gum rosins, latent color bodies may be present in small amount. The presence of latent color bodies in rosin renders such rosin of no use in the production of high grade soaps, limed varnishes, sizes, etc., which contain an alkali, since the color bodies gradually darken when the product is exposed to the air, which results in undesirable darkening of the product.

Heretofore, various methods have been suggested for the substantial elimination of latent color bodies from wood rosin and from gum rosin when contained and such methods have proved substantially effective for the substantial elimination of latent color bodies from wood rosin and from gum rosin containing such bodies. However, such methods are not always effective for the production of rosin having maximum desirable characteristics.

My invention has for its object a method for the treatment of rosin whereby the coloring matter and latent color bodies will be removed with increased efficiency, whereby a rosin of maximum lightness of color will be produced and which will not darken on aging in the presence of oxygen and an alkali, as when used for the making of soaps, limed varnishes, certain sizes, etc.

In accordance with the method embodying my invention, the rosin is first treated for the substantial removal of coloring matter, and of latent color bodies in the case of wood rosin and of gum rosin where such bodies are contained, and then treated to effect a further lightening of the color and elimination of residual color bodies.

In the practical adaptation of the method in accordance with my invention, the rosin is first subjected to treatment with a substance, a solvent for the color bodies, including latent color bodies, contained in the rosin and which, if it be also a solvent for the rosin, will have a greater solvent action on the latent color bodies than on the rosin. Desirably, the rosin is subjected to treatment with such a substance while in solution in a solvent for the rosin which is substantially immiscible at some definite temperature with such substance and which, if it have any solvent action on the color bodies such will be less than its solvent action on the rosin. The substance, solvent of the color bodies should essentially be substantially neutral or non-alkaline in order to avoid saponification of rosin in the treatment and should be an organic or inorganic liquid, as should also be the solvent for the rosin when used.

After treatment of the rosin with a substance solvent for the color bodies, including latent color bodies contained in the rosin, as generally indicated above, the rosin is subjected to distillation under reduced pressure and at a temperature at which the rosin will not be decomposed, which will result in its separation from the residual color bodies, including any latent color bodies. If desired the distillation may be carried on in the presence of a chemically inert atmosphere.

In carrying out the method in accordance with my invention into practice, the rosin is first treated with a substance a solvent of the color bodies, including latent color bodies as, for example, a non-alkaline, organic liquid, such as furfural, furfuryl alcohol, aniline, phenol, ethylene chlorohydrin, etc. or a non-alkaline inorganic liquid as liquid sulphur dioxide, etc. The rosin, as has been indicated, may be subjected to treatment in solution in a solvent therefor which is substantially immiscible with the solvent for the color bodies at or below the normal temperature, say for example, a temperature within the range 5° F. to 125° F., such as gasoline, naptha, petroleum ether, or other light petroleum distillate or other rosin solvent having the characteristics of substantial immiscibility with the solvent for the color bodies and greater solvent action on the rosin than on the color bodies and hence an equivalent thereof. After treatment of the rosin for the removal of color bodies, as indicated, the treated rosin is subjected to distillation in a suitable still preferably in the presence of a chemically inert gas as, for example, carbon dioxide, nitrogen, steam, or the like, under reduced pressure and at a temperature not substantially in excess of about 300° C. Desirably the distillation step is carried out under a pressure within about the range 10–40 mm. mercury.

In carrying out the method where the solvent for the color bodies has also a solvent action on the rosin, the rosin may be treated with the solvent for the color bodies alone, the rosin to be treated being subjected to the action of a quantity of the solvent, which in due course will dissolve the rosin and contained color bodies. The rosin substantially freed from color bodies being recovered by evaporation off of the solvent to a point such that the rosin will be precipitated from the solvent while the color bodies will be retained in solution in the solvent. If desired, after the rosin and contained color bodies become dissolved in the solvent for the color bodies, the rosin may be extracted from the solvent for the color bodies by admixing with the solution a quantity of solvent for the rosin, which will extract the rosin from the solution leaving the color bodies in the solution. Since the solvent for the rosin, as has been indicated, is substantially immiscible with the solvent for the color bodies, the extracted rosin in solution in the rosin solvent may be readily separated from the color bodies in solution in the solvent for the color bodies by merely regulating the temperature of the admixed solvents and permitting separation into layers by gravity, or the separation may be effected by centrifugation. As an alternative method of carrying out the method, the rosin containing color bodies may be first dissolved in a suitable solvent and the solution subjected to treatment, as by washing with a quantity of the solvent for the color bodies contained in the rosin. With such procedure the solvent for the color bodies extracts the color bodies from the solution of rosin in its solvent and the two solutions thus formed may be readily separated by control of the temperature of the mixture and settlement, or by centrifugation.

In carrying out the method, the solvent for the color bodies and the solvent for the rosin may desirably be miscible at certain temperatures as well as immiscible at other temperatures. In such case, the method may be carried out by first dissolving the rosin in the solvent for the rosin, adding to the solution a quantity of the solvent for the color bodies, controlling the temperature of the mixture to effect miscibility of the two solvents and finally controlling the temperature to effect immiscibility with subsequent separation by settlement or centrifugation.

As examples of the practical adoption of the method in accordance with my invention, the following will be illustrative:

For example, 15 pounds of wood rosin, are dissolved in 85 pounds of gasoline and to the solution formed is added 11 pounds of technical furfural and the mixture thoroughly agitated to secure intimate contact between the furfural and the gasoline-rosin solution. The mixture is then allowed to separate with the result that the furfural and dissolved color bodies will separate into a layer beneath a layer of gasoline-rosin solution, which may be siphoned or decanted off and from which refined rosin substantially freed from color bodies may be recovered by distillation off of the gasoline. The treatment above may be carried out at normal room temperature, say about 60° F., or alternatively the mixture of rosin solution and furfural may be heated to a temperature at which the furfural will go into solution in the gasoline, for example, a temperature of about 115° F., after which the temperature of the resultant solution is lowered to a point at which the furfural and gasoline are immiscible or will separate, which may be a normal room temperature, say 60° F., and the separation may be effected at a temperature lower than normal room temperature, say 10° F., whether the mixture of gasoline-rosin solution and furfural is heated or merely agitated, it being appreciated that the lower the temperature used, the more rapid and complete will be the separation.

On separation of the gasoline-rosin solution from the furfural-color body solution, it will be found that the gasoline-rosin solution will contain some furfural and a small amount of color bodies and that the furfural-color bodies solution will contain some gasoline and rosin, since the furfural is not completely immiscible with or separable from the gasoline and the furfural has a solvent power on the rosin though used in insufficient quantity, relative to the quantity of gasoline used, to take up any very substantial quantity of the rosin. If a more completely refined rosin is desired, the gasoline-rosin solution, after treatment with the separation from the furfural, may be retreated with a further quantity of furfural, or a greater quantity of furfural, relative to the quantity of gasoline, may be used in the initial treatment, though such proceeding will reduce the yield of refined rosin.

As illustrative of an alternative application of the method embodying my invention, for example, 15 pounds of rosin may be dissolved in 11 pounds of technical furfural and 85 pounds of gasoline added to the solution. The mixture is then agitated, or heated to a temperature at which the furfural will dissolve in the gasoline, say 115° F., followed by separation of the gasoline-rosin solution from the furfural-color-bodies solution, at room temperature, say 60° F., or below, say 10° F. If desired, the rosin solution, after separation from the furfural-color-bodies solution, may be treated with furfural for further refinement of the rosin.

The rosin, after completion of the treatment with furfural, is placed in a still suitably connected to a condenser, and heated sufficiently to melt the rosin. A current of chemically inert gas, as, for example, steam, carbon dioxide, nitrogen, and the like, is bubbled through the molten rosin in the still, displacing the air from the still, condenser and connecting pipes with continuance of the flow of the chemically inert gas used. The temperature of the rosin in the still is raised to about 300° C. and the pressure in the still is reduced to an extent sufficient to effect distillation of the rosin at the temperature used. With a temperature of 300° C. the pressure should be about 10–40 mm. mercury and, as has been indicated, the flow of steam may be continued throughout the distillation.

The distillation of the rosin in a vacuum, preferably in the presence of a chemically inert gas causes the residual color bodies, including any latent color bodies, to remain in the distillation residue.

It will be appreciated that in place of furfural various other solvents for the color bodies may be used, as indicated herein, and that in place of gasoline other equivalent solvents for the rosin may be used, as indicated herein. Likewise, chemically inert gases equivalent to carbon dioxide may be used in connection with the distillation.

The rosin the result of the treatment in accordance with my invention, as illustrated above, will be found to be of an extremely light color and to be free from latent color bodies. The rosin is highly adaptable for the production of high grade soaps, limed varnishes, sizes, etc. containing an alkali, since it is initially light in color and will largely, if not completely resist darkening on aging under conditions of exposure to oxygen, as in the air, in the presence of an alkali. The rosin product will have an acid number of about 170, saponification number of 178, will contain about 0.1% of gasoline insoluble material and will grade WW in color.

It will be understood that the solvent for the color bodies and the solvent for the rosin may be recovered for reuse and that in the carrying out of the method in accordance with my invention no particular form of apparatus is required. It will be further obvious that the method in accordance with my invention is adaptable for the treatment of rosin generally, including both wood and gum rosin, though, as has been indicated, it is more particularly adaptable for the treatment of wood rosin, or gum rosin containing latent color bodies. In the case of high grade gum rosin free from latent color bodies, the application of my method will result in the production of a very light rosin, while in the case of wood rosin, or gum rosin containing latent color bodies, elimination of the latent color bodies will appear as an additional advantage of the application of my method to such rosin.

As will be obvious, the carrying out of the method in accordance with my invention is not dependent upon the use of any particular apparatus.

What I claim and desire to protect by Letters Patent is:—

1. The method of refining rosin which includes subjecting rosin to treatment with a non-alkaline solvent of color bodies in the rosin for the removal of color bodies therefrom, separating refined rosin from the solvent for the color bodies and color bodies removed thereby and subjecting the separated rosin to distillation under reduced pressure at a temperature at which the rosin will not be substantially decomposed and such that residual color bodies contained in the rosin will remain in the residue.

2. The method of refining rosin which includes subjecting rosin to treatment with two liquids capable of substantial immiscibility, one a non-alkaline liquid primarily a solvent of color bodies contained in the rosin and the other primarily a solvent for the rosin, separating the solvent for the rosin and rosin dissolved therein from the solvent of color bodies and color bodies dissolved therein, separating refined rosin from the rosin solvent and subjecting the separated rosin to distillation under reduced pressure at a temperature at which the rosin will not be substantially decomposed and such that residual color bodies contained in the rosin will remain in the residue.

3. The method of refining rosin which includes subjecting rosin to treatment with a non-alkaline liquid solvent of color bodies in the rosin for the removal of color bodies therefrom, separating refined rosin from the solvent of color bodies and color bodies dissolved therein and subjecting the separated rosin to distillation under reduced pressure at a temperature at which the rosin will not be substantially decomposed and such that residual color bodies contained in the rosin will remain in the residue.

4. The method of refining rosin which includes subjecting rosin to treatment with a non-alkaline organic liquid solvent of color bodies in the rosin for the removal of color bodies therefrom, separating refined rosin from the solvent of color bodies and color bodies dissolved therein and subjecting the separated rosin to distillation under reduced pressure at a temperature at which the rosin will not be substantially decomposed and such that residual color bodies contained in the rosin will remain in the residue.

5. The method of refining rosin which includes subjecting rosin to treatment with two substantially non-alkaline liquids substantially immiscible at normal temperatures, one primarily a solvent of color bodies contained in the rosin, the other primarily a solvent for the rosin, separating the rosin solvent and rosin dissolved thereby from the color body solvent and color bodies dissolved thereby, distilling off the rosin solvent from the rosin-solvent solution for recovery of refined rosin and subjecting the recovered rosin to distillation under reduced pressure at a temperature at which the rosin will not be substantially decomposed and such that residual color bodies contained by the rosin will remain in the residue.

6. The method of refining rosin which includes subjecting rosin to treatment with a non-alkaline substance solvent of color bodies in the rosin for the removal of color bodies therefrom, separating refined rosin from the solvent of color bodies and color bodies dissolved thereby and subjecting the separated rosin to distillation under reduced pressure at a temperature not substantially above 300° C. in the presence of a non-oxidizing atmosphere.

7. The method of refining rosin which includes subjecting rosin to treatment with two non-alkaline liquids capable of substantial immiscibility, one primarily a solvent of color bodies contained in the rosin, the other primarily a solvent for the rosin, separating the rosin solvent and rosin dissolved thereby from the color body solvent and color bodies dissolved thereby, separating refined rosin from the rosin solvent and subjecting the separated rosin to distillation under reduced pressure at a temperature not substantially above 300° C. and in an inert atmosphere.

8. The method of refining rosin which includes subjecting rosin to treatment with furfural, separating refined rosin from the furfural and subjecting the separated rosin to distillation under reduced pressure at a temperature at which the rosin will not be substantially decomposed and such that residual color bodies contained in the rosin will remain in the residue.

9. The method of refining rosin which includes subjecting rosin to treatment with furfural, separating refined rosin from the furfural and subjecting the separated rosin to distillation under reduced pressure at a temperature not substantially above 300° C.

10. The method of refining rosin which includes subjecting rosin to treatment with furfural, separating refined rosin from the furfural and subjecting the separated rosin to distillation under reduced pressure at a temperature not substantially above 300° C. in the presence of an inert atmosphere.

11. The method of refining rosin which includes washing a solution of rosin in a solvent therefor with furfural, separating furfural from the rosin-solvent solution, separating refined rosin from the rosin-solvent solution and subjecting the separated rosin to distillation at a temperature at which the rosin will not be substantially decomposed and such that residual color bodies contained in the rosin will remain in the residue.

12. The method of refining rosin which includes washing a solution of rosin in gasoline with furfural, separating furfural from the rosin-gasoline solution, separating refined rosin from the rosin-gasoline solution and subjecting the separated rosin to distillation at a temperature at which the rosin will not be substantially decomposed and such that residual color bodies contained in the rosin will remain in the residue.

13. The method of refining rosin which includes washing a solution of rosin in gasoline with furfural, separating furfural from the rosin-gasoline solution, separating refined rosin from the rosin-gasoline solution and subjecting the separated rosin to distillation under a pressure of 10–40 mm. mercury and at a temperature not substantially in excess of about 300° C.

14. The method of refining rosin which includes washing a solution of rosin in gasoline with furfural, separating furfural from the rosin-gasoline solution, separating refined rosin from the rosin-gasoline solution and subjecting the separated rosin to distillation under a pressure of 10–40 mm. mercury and at a temperature not substantially in excess of about 300° C. in the presence of an inert atmosphere.

15. The method of refining rosin which includes washing a solution of rosin in gasoline with furfural, separating furfural from the rosin-gasoline solution, separating rosin from the rosin-gasoline solution and subjecting the separated rosin to distillation under a pressure of 10–40 mm. mercury and at a temperature not substantially in excess of about 300° C. in the presence of steam.

16. The method of refining rosin which includes subjecting rosin to treatment with phenol, separating refined rosin from the phenol and subjecting the separated rosin to distillation under reduced pressure at a temperature at which the rosin will not be substantially decomposed and such that residual color bodies contained in the rosin will remain in the residue.

17. The method of refining rosin which includes subjecting rosin to treatment with furfuryl alcohol, separating refined rosin from the furfuryl alcohol and subjecting the separated rosin to distillation under reduced pressure at a temperature at which the rosin will not be substantially decomposed and such that residual color bodies contained in the rosin will remain in the residue.

18. The method of refining rosin which includes subjecting rosin to treatment with phenol, separating refined rosin from the phenol and subjecting the separated rosin to distillation under reduced pressure at a temperature not substantially above 300° C.

19. The method of refining rosin which includes subjecting rosin to treatment with furfuryl alcohol, separating refined rosin from the furfuryl alcohol and subjecting the separated rosin to distillation under reduced pressure at a temperature not substantially above 300° C.

20. The method of refining rosin which includes subjecting rosin to treatment with phenol, separating refined rosin from the phenol and subjecting the separated rosin to distillation under reduced pressure at a temperature not substantially above 300° C. in the presence of an inert atmosphere.

21. The method of refining rosin which includes subjecting rosin to treatment with furfuryl alcohol, separating refined rosin from the furfuryl alcohol and subjecting the separated rosin to distillation under reduced pressure at a temperature not substantially above 300° C. in the presence of an inert atmosphere.

22. The method of refining rosin which includes washing a solution of rosin in a solvent therefor with phenol, separating phenol from the rosin-solvent solution, separating refined rosin from the rosin-solvent solution and subjecting the separated rosin to distillation at a temperature at which the rosin will not be substantially decomposed and such that residual color bodies contained in the rosin will remain in the residue.

23. The method of refining rosin which includes washing a solution of rosin in a solvent therefor with furfuryl alcohol, separating furfuryl alcohol from the rosin-solvent solution, separating refined rosin from the rosin-solvent solution and subjecting the separated rosin to distillation at a temperature at which the rosin will not be substantially decomposed and such that residual color bodies contained in the rosin will remain in the residue.

24. The method of refining rosin which includes washing a solution of rosin in gasoline with phenol, separating phenol from the rosin-gasoline solution, separating refined rosin from the rosin-gasoline solution and subjecting the separated rosin to distillation at a temperature at which the rosin will not be substantially decomposed and such that residual color bodies contained in the rosin will remain in the residue.

25. The method of refining rosin which includes washing a solution of rosin in gasoline with furfuryl alcohol, separating furfuryl alcohol from the rosin-gasoline solution, separating refined rosin from the rosin-gasoline solution and subjecting the separated rosin to distillation at a temperature at which the rosin will not be substantially decomposed and such that residual color bodies contained in the rosin will remain in the residue.

26. The method of refining rosin which includes washing a solution of rosin in gasoline with phenol, separating phenol from the rosin-gasoline solution, separating refined rosin from the rosin-gasoline solution and subjecting the separated rosin to distillation under a pressure of 10–40 mm. mercury and at a temperature not substantially in excess of about 300° C.

27. The method of refining rosin which includes washing a solution of rosin in gasoline with furfuryl alcohol, separating furfuryl alcohol from the rosin-gasoline solution, separating refined rosin from the rosin-gasoline solution and subjecting the separated rosin to distillation under a pressure of 10–40 mm. mercury and at a temperature not substantially in excess of about 300° C.

28. The method of refining rosin which includes washing a solution of rosin in gasoline with phenol, separating phenol from the rosin-gasoline solution, separating refined rosin from the rosin-gasoline solution and subjecting the separated rosin to distillation under a pressure of 10–40 mm. mercury and at a temperature not substantially in excess of about 300° C. in the presence of an inert atmosphere.

29. The method of refining rosin which includes washing a solution of rosin in gasoline with furfuryl alcohol, separating furfuryl alcohol from the rosin-gasoline solution, separating refined rosin from the rosin-gasoline solution and subjecting the separated rosin to distillation under a pressure of 10–40 mm. mercury and at a temperature not substantially in excess of about 300° C. in the presence of an inert atmosphere.

In testimony of which invention, I have hereunto set my hand, at Kenvil, New Jersey, on this 23rd day of January, 1929.

ROY S. HANCOCK.